United States Patent [19]

Cooper

[11] Patent Number: 5,578,183
[45] Date of Patent: Nov. 26, 1996

[54] PRODUCTION OF ZINC PELLETS

[75] Inventor: John F. Cooper, Oakland, Calif.

[73] Assignee: Regents of the University of California, Oakland, Calif.

[21] Appl. No.: 439,388

[22] Filed: May 11, 1995

[51] Int. Cl.⁶ .............................. C25D 1/20; C25D 7/00
[52] U.S. Cl. .............................. 205/64; 205/74; 205/78; 205/111; 205/109
[58] Field of Search .............................. 205/64, 74, 78, 205/109, 111

[56] References Cited

U.S. PATENT DOCUMENTS

| | | | |
|---|---|---|---|
| 3,323,951 | 6/1967 | Kreiselmaier | 205/74 X |
| 3,753,779 | 8/1973 | Franko et al. | 205/111 X |
| 4,456,508 | 6/1984 | Torday et al. | 205/111 X |
| 5,453,293 | 9/1995 | Beane et al. | 205/109 X |

Primary Examiner—Donald R. Valentine
Attorney, Agent, or Firm—Henry P. Sartorio; Daryl S. Grzybicki

[57] ABSTRACT

Uniform zinc pellets are formed for use in batteries having a stationary or moving slurry zinc particle electrode. The process involves the cathodic deposition of zinc in a finely divided morphology from battery reaction product onto a non-adhering electrode substrate. The mossy zinc is removed from the electrode substrate by the action of gravity, entrainment in a flowing electrolyte, or by mechanical action. The finely divided zinc particles are collected and pressed into pellets by a mechanical device such as an extruder, a roller and chopper, or a punch and die. The pure zinc pellets are returned to the zinc battery in a pumped slurry and have uniform size, density and reactivity. Applications include zinc-air fuel batteries, zinc-ferricyanide storage batteries, and zinc-nickel-oxide secondary batteries.

11 Claims, 4 Drawing Sheets

PRODUCTION OF ZINC PELLETS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the production of zinc pellets for use in a refuelable zinc-air battery.

2. Description of Related Art

Batteries having zinc electrodes may be constructed to consume particles of zinc metal. Zinc particle electrodes have the advantage of high active surface area per unit cross-section of the cell, which allows higher average current densities without excessive polarization. The particles may be in a stationary packed bed that is in continuous contact with a current collector, or may form a flowing slurry where the particles make intermittent contact with a current collector. In both cases, an electrolyte solution provides ionic conduction and carries away heat and reaction products. The electrolyte may also function as a reactant or to provide reactants. The electrolyte solution is typically an alkaline electrolyte such as potassium hydroxide, lithium hydroxide, sodium hydroxide, or a mixture thereof. (See Cooper, U.S. patent Ser. No. 08/152,964, now U.S. Pat. No. 5,434,020).

Electric vehicles making use of zinc-air batteries require (for economic reasons) a recycling of battery reaction products to form new zinc particles. On discharge, the zinc particles produce electricity and a reaction product consisting of zinc oxides, zincate ions, and zinc hydroxides. These reaction products can be converted back into zinc metal by cathodic reduction (electroplating or electrowinning). However, the zinc must be recovered in the form of particles of a size that can be used in the battery. If the particles are too large, pumping is difficult and the resultant electrode has a low active surface area. If the particles are too small, then the porosity of the resultant bed will be too low for sufficient electrolyte flow, and reaction products will clog the bed.

One type of zinc-air battery currently available cannot be recharged, but uses battery cassettes that are removed from the vehicles for charging. The zinc plates must be replaced and the spent, oxidized plates are reprocessed. Another conventional zinc-air battery is charged by connecting it to a recharger, which takes six hours for a full charge in the laboratory.

Thus, it is desirable to recover the zinc metal from spent electrolyte in the form of particles of substantially pure zinc having controlled and uniform size. The zinc particles may be transferred into a battery in the form of a pumped slurry—a technique called "hydraulic refueling." This invention provides a method for producing particulate zinc) and compressing the zinc into pellets having reproducible and uniform chemical, morphological, and physical properties.

SUMMARY OF THE INVENTION

The present invention is a method for producing zinc pellets of uniform size and shape for use in zinc-air batteries having a stationary or moving slurry zinc particle electrode. The process involves the cathodic deposition of zinc from zinc-containing electrolyte, a zinc-air battery reaction product. The zinc is deposited on an electrode substrate to which the zinc does not adhere (such as stainless steel or magnesium). The pure zinc deposits have a finely divided morphology, which is commonly called mossy, bulbous, or dendritic zinc.

The mossy zinc may be removed from the electrode substrate by the action of gravity, entrainment in a flowing electrolyte, or by mechanical action. The finely divided zinc particles are collected and pressed into pellets by a mechanical device such as an extruder, a roller and chopper, or a punch and die. The pellets have uniform size, density, and reactivity and are returned to the zinc battery in a pumped slurry. These pellets are useful in zinc-air fuel batteries, zinc-ferricyanide storage batteries, and zinc-nickel-oxide secondary batteries.

In electric vehicle applications, rapid battery refueling enables the vehicle to operate beyond the range limits imposed by its energy storage capability, i.e., allowing repeated use throughout the day interrupted by short intervals for refueling. This invention will make rapid refueling possible and provide a capability for nearly continuous operation of electric vehicles.

DETAILED DESCRIPTION OF THE INVENTION

The present invention is a process for making zinc pellets for use in zinc-air batteries, particularly those having a quasi-stationary packed bed zinc particle anode. Particulate zinc having high surface area is produced by electrochemical deposition from an alkaline zinc-containing electrolyte solution. The zinc deposits have mossy, dendritic, or bulbous morphology and are compressed mechanically into compact, coherent, porous pellets.

Zinc Deposition

Figure 1A:
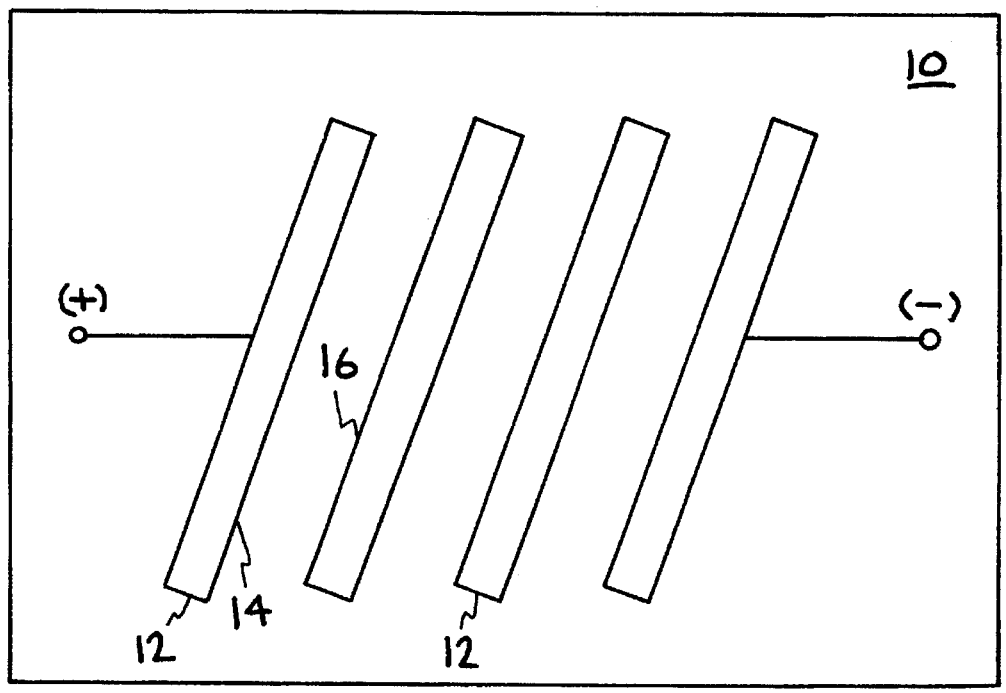
FIG. 1a shows a bipolar array of electrolysis cells for cathodic deposition of zinc metal according to the present invention.

FIG. 1a shows an embodiment of the zinc deposition apparatus, an electrolysis cell 10. The cell 10 has a series of sheet electrodes 12 configured to form a bipolar array, where an electrolyte solution flows between the electrodes 12. The solution contains zinc as an electrochemically reducible compound such as zincate ions, zinc oxide colloids, or zinc hydroxides. This solution may be the spent electrolyte from a discharged zinc-air battery.

In a bipolar configuration, the electrodes 12 are not connected to each other by busses, but pass a current normal to the surface of each electrode—one side sustains an anode 14 reaction and the other a cathode 16 reaction. The electrodes 12 are preferably tilted or inclined so that the downward facing surface 14 sustains the anodic evolution of oxygen gas, while the upward facing electrode 16 supports the cathodic deposition of zinc in a particulate morphology. The upward movement of gas bubbles generates an electrolyte convection current that draws fresh electrolyte into the space between the electrodes 12 to replenish the zinc compound continuously depleted by the cathodic reaction.

An electrolysis process is carried out in the cell 10 so that zinc metal is deposited on the cathode 16 under conditions that are known to produce a highly porous deposit (about 15–20% density) consisting of small particles of zinc. Suitable morphologies include dendritic zinc, mossy zinc, and bulbous zinc. These morphologies are formed under conditions where the mass-transport capability of the electrode is approached or exceeded. The cathodic reaction is $$Zn(OH)_2 + 2e^- \leftarrow\rightarrow Zn + 2OH^-.$$

If mass transport is sufficiently restricted, the hydroxide by-product of the reduction accumulates adjacent to the electrode surface (in a region called the diffusion layer), which lowers the electrical potential at which zinc is deposited.

The cathode 16 substrate is chosen from materials to which zinc electrodeposits do not adhere. Examples of suitable electrode substrates include: stainless steel, nickel-plated metal electrodes, magnesium electrodes, and conductive ceramic electrodes stable at zinc deposition potentials. The electrodes may be coated with an insulating barrier film containing pin holes through which electrolyte can reach the substrate and support the deposition of zinc. Zinc tends to deposit preferentially at the asperities projecting through the diffusion layer into the bulk electrolyte at a lower hydroxide concentration.

The mossy zinc formed on the cathode 16 may be removed by the action of gravity (detaching under its own weight), by the natural or forced convection of electrolyte, or by mechanical action. Tilting the cathode 16 from the vertical position may serve to keep fine zinc deposits on the electrode and prevent detached zinc particles from touching the anode 14. The collected deposit may be agitated to produce the finely divided zinc particles. These particles (about 1–100 micrometers in size) are collected and pressed into pellets.

Figure 1B:
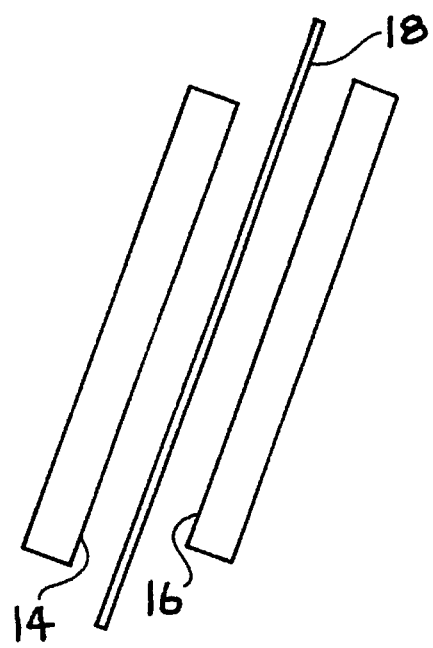
FIG. 1b shows a unipolar electrolysis cell for cathodic deposition of zinc.

In a second embodiment of the cell shown in FIG. 1b, the electrodes are arranged in a unipolar array, with alternating anodes 14 and cathodes 16. Each side of the sheet cathode 16 supports the deposition of finely divided, non-adhering zinc, which is removed from the substrate as before. The anodic reaction occurs within the body of a porous flow-through carbon electrode; the reaction is typically the electrochemical oxidation of ferrocyanide ion to ferricyanide ion in alkaline electrolyte. The anode 14 and cathode 16 are separated by an ionically conductive membrane 18 (e.g., Nafion) or by a diffusion barrier (such as non-woven polypropylene treated to be wettable by the electrolyte).

Zinc Pellet Fabrication

The particulates of finely divided zinc produced electrochemically as described above may be transformed into coherent aggregates or pellets of uniform size, density, porosity, and reactivity by a cold-compression or a cold-forming operation. The final pellets do not contain binders, such as carbon or other conductive materials. The compression of zinc deposits (and other metals) into pellets occurs most readily when the temperature of the particulates is more than about one-half the melting point of the zinc measured on the absolute scale—i.e., at a temperature of 346 K (73° C.). Under these conditions, the particulates of zinc are sufficiently soft and malleable to be readily pressure bonded to form zinc aggregates that hold together when pumped as slurry or agitated in a bubbling bed.

Figure 2:
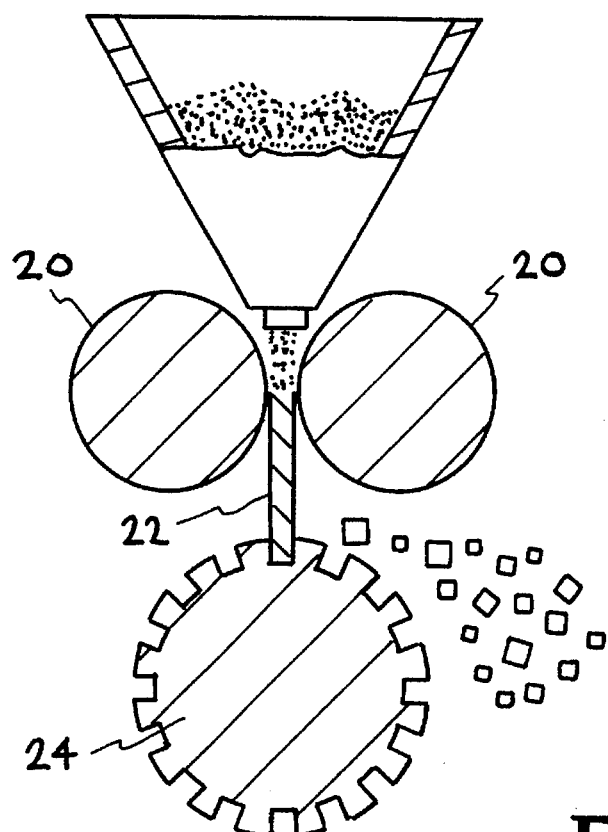
FIG. 2 shows a method of pelletizing zinc particulate using a roller and chopper.

There are many practical means for forming the pellets. In one embodiment shown in FIG. 2, the zinc particulates are compressed between cylindrical rollers 20 into a coherent sheet 22 of known porosity. The rollers 20 may have a regular pattern of equatorial ribs so that the sheet 22 emerges from the rollers 20 as parallel strips of metal. The particles of uniform size are then formed when the strips are subsequently chopped by a rotating blade. Alternatively, the zinc sheets may be brought against a rotating toothed wheel 24 with discrete teeth that cut the sheet into roughly cubical pellets. The pellets produced may be of any size or porosity, but are typically about one millimeter in diameter and about 60% (±10%) of full density.

In another embodiment, finely divided zinc is pressed into pellets by the action of a pin which presses the zinc into a mold or die. This process is capable of mass production of pellets when large numbers of conical pins are arranged on the circumference of a cylinder which is allowed to rotate within and in contact with a cylindrical shell with a matching array of dies. The shape of the pin and the mold (e.g., truncated cones) achieves the volume reduction necessary for bonding the particulates into a coherent pellet.

Figure 3:
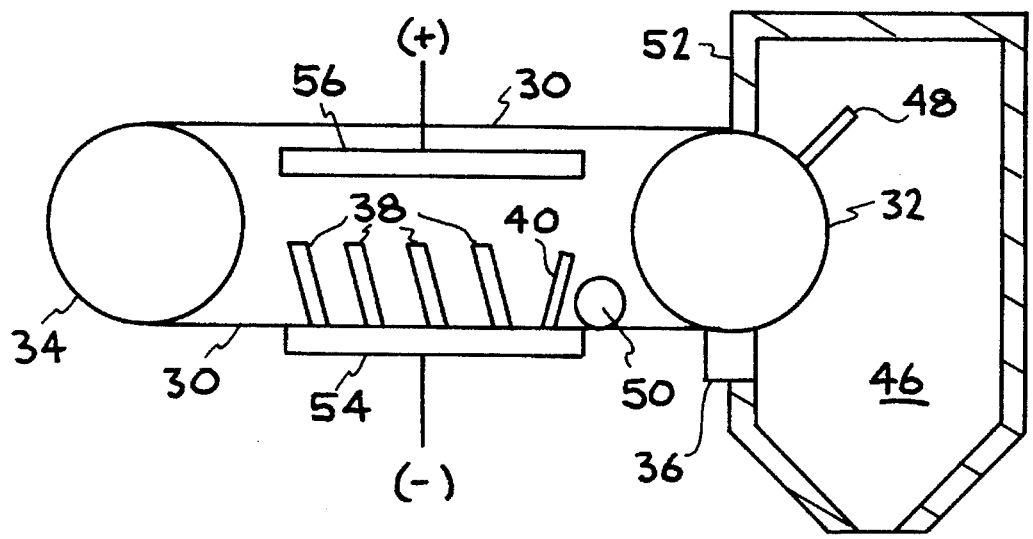
FIG. 3 shows a method of pelletizing zinc particulate by cathodic polarization.

In a third illustrative embodiment, the zinc particles may be collected and pressed into pellets under conditions of cathodic polarization by a punch-and-die technique employing a moving perforated belt. FIG. 3 shows a pellet press with a perforated belt 30 and toothed roller 32. The perforated belt 30 circulates counterclockwise over a flat roller 34 and a toothed roller 32. The toothed roller 32 acts against an anvil 36. The perforated belt 30 is exposed to fine zinc particles, which fill the cavities with the assistance of applicators 38. Excess material may be removed from the belt 30 by a scraper 40.

Figure 4:
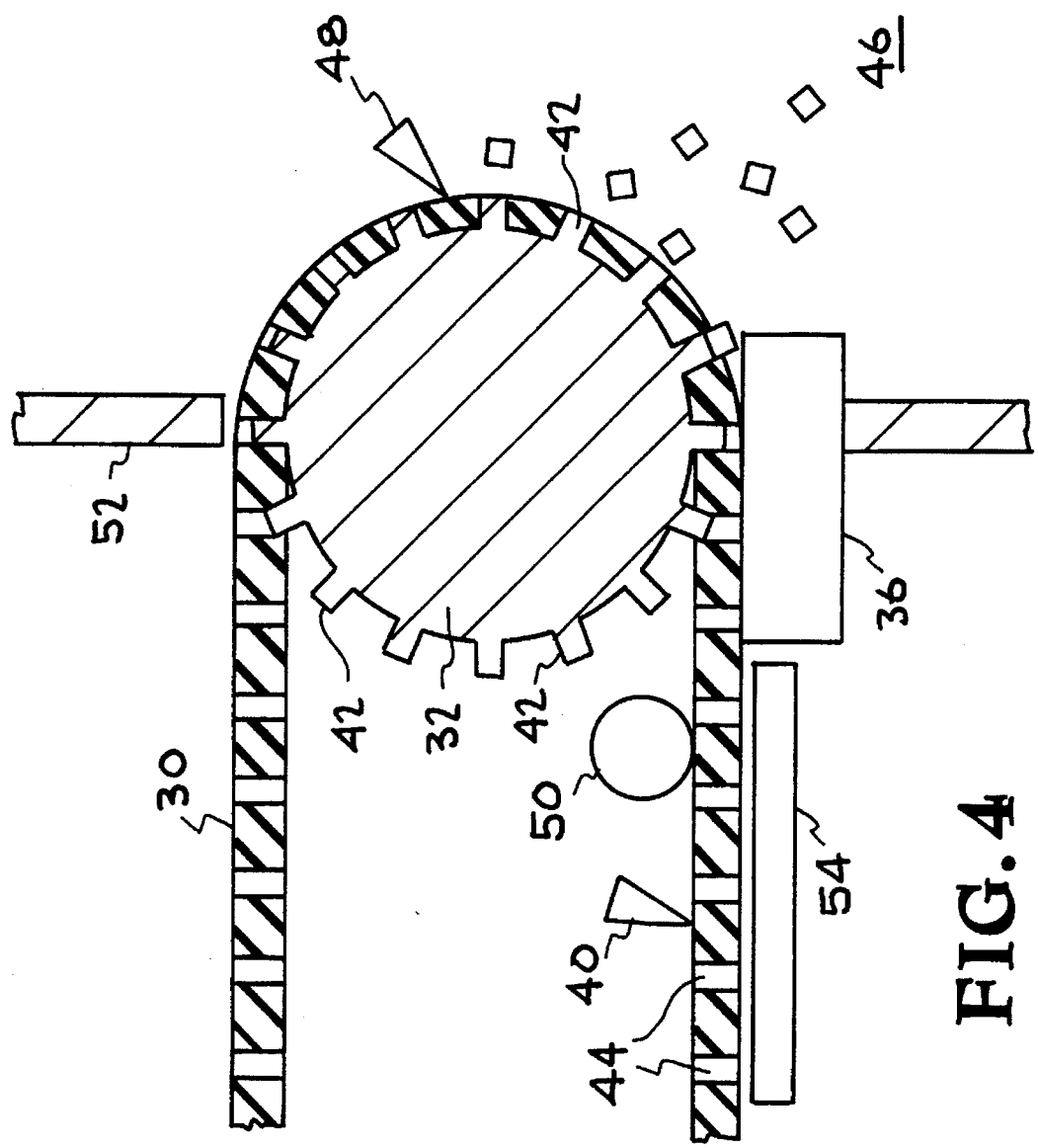
FIG. 4 shows the compression of zinc particulate into discrete pellets, using a perforated belt and toothed roller.

As shown in FIG. 4, the toothed roller 32 presses the zinc particles into pellets by having the teeth 42 penetrate into the cavities 44 in the belt 30. The teeth 42 may be cylindrical and of equal or greater length than the cavities 44. The spacing of the roller 32 relative to the anvil 36 is such that pellets of smaller dimensions than the cavities 44 are formed by hydrostatic compression.

After exiting the anvil 36 area, the belt 30 has sufficient tension that the movement of the belt 30 against the roller 32 forces the teeth 42 through the belt 30, thus ejecting the pellets into a storage area 46. Another scraper 48 may complete removal of the pellets by forcing the perforated belt 30 against the roller 32. The scraper 48 may also remove excess zinc particles. An auxiliary roller 50 may further locate the position of the perforated belt 30 relative to the roller 32 and anvil 36. A wall 52 separates the region 46 of pellets from the area containing the finely divided zinc.

The belt 30 and roller system may be contained within a bath of electrolyte solution. An electrode 54 that is cathodically polarized at one surface rests against the belt 30 so as to cause reduction of any residual zinc oxides or hydroxides and to cause electrodeposition of zinc from the electrolyte. The opposite surface of the cathode 54 is covered with an insulating material to prevent electrolysis. A counter electrode, an anode 56, is positioned parallel to the cathode 54 such that any fall of zinc particles against the perforated belt 30 is not impeded, and a minimum of zinc collects on the anode 56.

Zinc Pellet Recycling System

Figure 5:
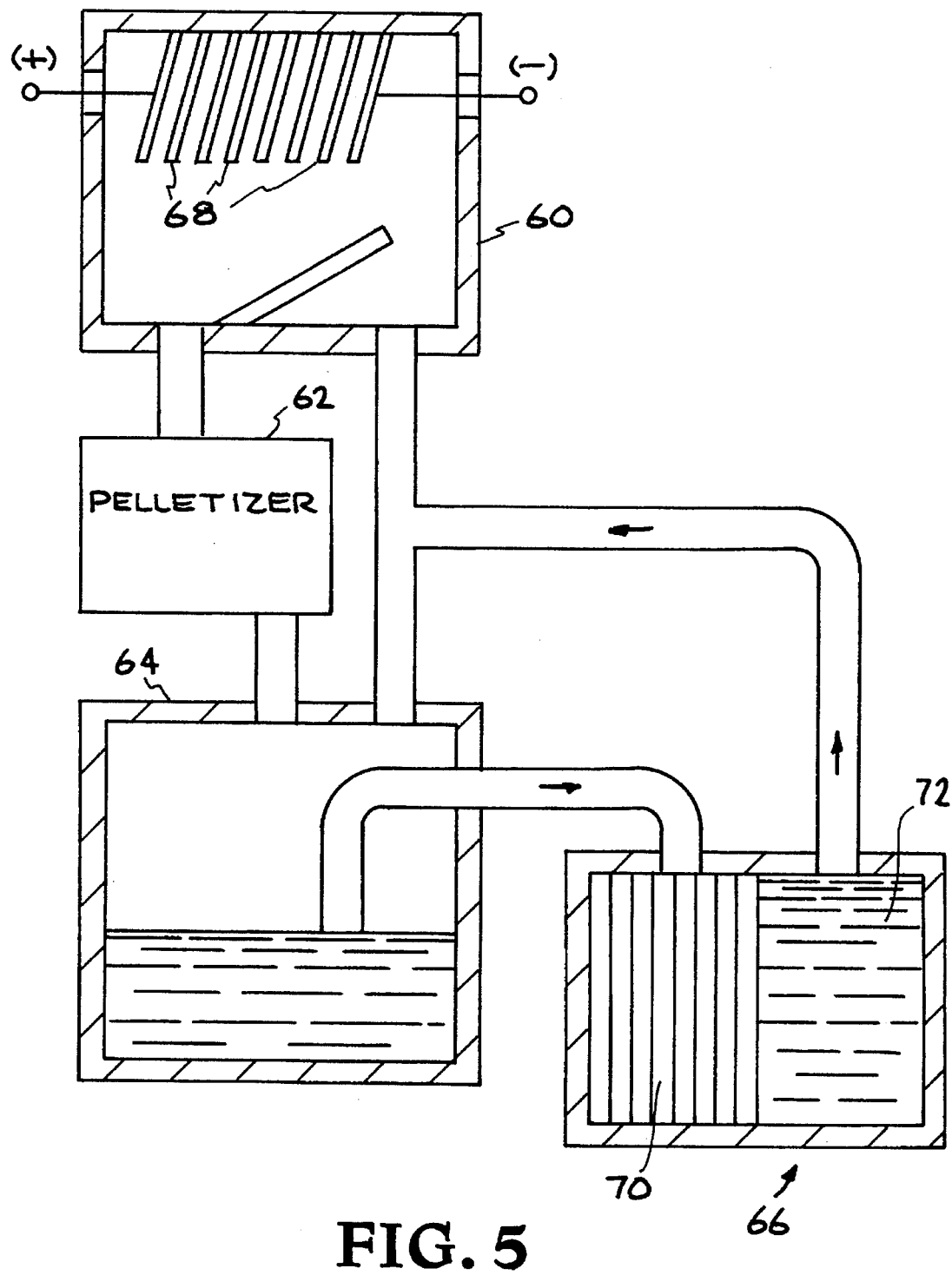
FIG. 5 shows a diagram of the integration of the zinc electrowinning process and pelletizing unit for recycling battery reaction products.

A slurry of zinc pellets, entrained in an electrolyte flow, formed by any of the methods described above may be used to recharge a zinc-air battery. An integrated system is shown in FIG. 5. The system includes an electrolysis tank 60 for recovery of spent battery products, a pelletizer unit 62, and a pellet-electrolyte storage unit 64. The refueling operation is accomplished by transferring spent zinc oxide-rich electrolyte from a discharged zinc-air battery 66 to the electrolysis tank 60, typically using a pump.

The tank 60 contains a stack of inclined sheet electrodes 68 for producing mossy zinc. The zinc particles are removed from the electrode array and collected in a pelletizer unit 62. The pelletizer 62 produces zinc pellets (0.2–1.5 mm size, preferably about 1 mm), which are then delivered to a pellet-electrolyte storage unit 64. The pelletizer unit 62 may produce pellets by any of the fabrication methods described above.

The storage unit 64 contains the electrolyte solution, typically the zinc-depleted electrolyte produced by the electrolysis. A slurry of the pellets and electrolyte is pumped back into the battery 66. The battery 66 consists of a stack of bipolar cells 70 an electrolyte storage tank 72 and that are gravity fed with the zinc pellets from overlying hoppers. In a typical battery reaction, zinc metal and atmospheric oxygen are consumed, producing a liquid suspension of zinc oxides and potassium zincate in an alkaline electrolyte:

$Zn + \tfrac{1}{2}O_2(air) + KOH \rightarrow KZnOOH\ (aq)$.

EXAMPLE

An integrated refueling system has been developed for a zinc-air battery. Each electrochemical cell consists of a hopper, circulation channels for air and electrolyte, a bipolar air electrode, and a porous separator. A stack of cells (12) is combined with an electrolyte storage tank. The electrode area (250 $cm^2$) and hopper volume (150 $cm^3$) are chosen to yield a peak power of about 125 W and a nominal energy of up to 525 Wh (at 1.2 $kW/m^2$). This combination may be useful for a shuttle bus application requiring a 5–10 hour rate and modest power. The electrode area, hopper volume and storage tank volume can be varied independently to match vehicle power and energy requirements. Long electrolyte channels between cells reduce shunt losses for a twelve cell stack to below 0.5% of gross power. Electrolyte flows upwards at a phase velocity of 1 cm/s, while air flows downward at four times the rate required by stoichiometry for 6 $kA/m^2$ (the maximum cell current density).

Zinc pellets are fed into the assembled twelve-cell stack of 250 $cm^2$ cells before discharge through two internal 2.5 cm diameter tubes, driven by combine flow of 4.5 L/min with a total pressure drop of 2 kPa across the stack. The cells fill sequentially at a rate of four cells per minute. Three parallel sets of three twelve-cell stacks connected in hydraulic series can be refueled in under ten minutes and will contain 56.7 kWh of deliverable energy.

The foregoing description of preferred embodiments of the invention is presented for purposes of illustration and description and is not intended to be exhaustive or to limit the invention to the precise form disclosed. Many modifications and variations are possible in light of the above teaching.

I claim:

1. An electrochemical process for producing porous zinc pellets for use in a zinc-air battery, comprising:

depositing zinc particles by cathodic deposition onto a substrate, wherein the particles do not permanently adhere to the substrate;

removing the zinc particles from the substrate;

mechanically compressing the particles; and forming zinc pellets.

2. A process as recited in claim 1, wherein depositing the particles is carried out such that the particles have a morphology selected from the group consisting of mossy, dendritic, and bulbous.

3. A process as recited in claim 1, wherein depositing the particles is carried out such that the particles are deposited on an array of sheet electrodes.

4. A process as recited in claim 3, wherein the array of electrodes is inclined from the vertical position such that the cathodically polarized sides face upward.

5. A process as recited in claim 1, wherein removing particles is carried out by a process selected from the group consisting of the action of gravity, the natural or forced convection of electrolyte, and mechanical action.

6. A process as recited in claim 1, wherein compressing particles is carried out using a roller.

7. A process as recited in claim 6, wherein forming pellets is carried out by a process selected from the group consisting of using a toothed wheel and using a chopping blade.

8. A process as recited in claim 1, wherein compressing particles and forming pellets is carried out using a punch and die.

9. A process as recited in claim 1, wherein compressing particles and forming pellets is carried out using a moving perforated belt and toothed roller.

10. A process as recited in claim 9, wherein the perforated belt is cathodically polarized.

11. A process as recited in claim 1, wherein the pellets are about 0.2 mm to about 1.5 mm in size.

\* \* \* \* \*